United States Patent
Sato et al.

(10) Patent No.: US 11,591,723 B2
(45) Date of Patent: Feb. 28, 2023

(54) GLASS FIBER-REINFORCED RESIN MOLDED ARTICLE, HOUSING OF ELECTRONIC DEVICE, INTERIOR COMPONENT FOR MOBILITY PRODUCT AND EXTERIOR COMPONENT FOR MOBILITY PRODUCT

(71) Applicant: NITTO BOSEKI CO., LTD., Fukushima (JP)

(72) Inventors: Noriyoshi Sato, Fukushima (JP); Hideaki Monma, Fukushima (JP); Chikako Matsuda, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 17/765,605

(22) PCT Filed: May 21, 2021

(86) PCT No.: PCT/JP2021/019312
§ 371 (c)(1),
(2) Date: Mar. 31, 2022

(87) PCT Pub. No.: WO2021/251103
PCT Pub. Date: Dec. 16, 2021

(65) Prior Publication Data
US 2022/0356609 A1    Nov. 10, 2022

(30) Foreign Application Priority Data
Jun. 10, 2020   (JP) .............................. JP2020-100877

(51) Int. Cl.
*D03D 13/00*  (2006.01)
*D03D 15/267*  (2021.01)
*B29C 70/22*  (2006.01)

(52) U.S. Cl.
CPC ........... *D03D 13/008* (2013.01); *B29C 70/22* (2013.01); *D03D 15/267* (2021.01); *D06N 2201/082* (2013.01); *D10B 2101/06* (2013.01)

(58) Field of Classification Search
CPC .... D03D 15/00; D03D 1/0082; D03D 13/008; D03D 15/267; B29C 70/22;
(Continued)

(56) References Cited

U.S. PATENT DOCUMENTS

2013/0045373 A1   2/2013  Adachi
2016/0193807 A1   7/2016  Sakuma et al.
(Continued)

FOREIGN PATENT DOCUMENTS

JP   H02-26733 A    1/1990
JP   H06-248572 A   9/1994
(Continued)

OTHER PUBLICATIONS

Supplementary European search report dated Nov. 9, 2022 issued in the corresponding EP Patent Application No. 21821854.3.

*Primary Examiner* — Camie S Thompson
(74) *Attorney, Agent, or Firm* — Carrier Blackman & Associates, P.C.; Joseph P. Carrier; Fulchand P. Shende

(57) ABSTRACT

The glass fiber-reinforced resin molded article includes a glass fiber fabric and a transparent resin. The average resin unimpregnation ratio in proximity to filament of the glass fiber fabric is more than 2.0% and 50.0% or less, the warp yarn width Bt and the weft yarn width By of the glass fiber fabric each are from 0.50 to 8.50 mm, the warp yarn weaving density Wt and the weft yarn weaving density Wy of the glass fiber fabric each are from 3.0 to 50 yarns/25 mm, and the degree of widening of warp yarn Et and the degree of widening of weft yarn Ey of the glass fiber fabric each are from 0.70 to 1.10.

10 Claims, 1 Drawing Sheet

(58) Field of Classification Search
CPC .......... D06N 2201/082; D10B 2101/06; D10B 2505/02; C03C 25/1095; C03C 3/091; C03C 13/046; C08J 5/06; C08J 5/248; C08J 5/08; C08J 2367/00; C08L 101/00
USPC .......... 442/180, 59, 63, 210, 219, 226, 254; 428/365, 368, 364, 375, 370, 385
See application file for complete search history.

(56) References Cited

U.S. PATENT DOCUMENTS

| | | |
|---|---|---|
| 2018/0094110 A1 | 4/2018 | Nakanishi et al. |
| 2018/0305846 A1 | 10/2018 | Tachibana et al. |
| 2020/0071858 A1 | 3/2020 | Ikejiri et al. |

FOREIGN PATENT DOCUMENTS

| | | |
|---|---|---|
| JP | H07-195361 A | 8/1995 |
| JP | H11-320737 A | 11/1999 |
| JP | 2000-054258 A | 2/2000 |
| JP | 2005-319746 A | 11/2005 |
| JP | 2009-241476 A | 10/2009 |
| JP | 2012-144830 A | 8/2012 |
| JP | 2020-002520 A | 1/2020 |
| WO | 2015/079820 A1 | 6/2015 |
| WO | 2016/175248 A1 | 11/2016 |
| WO | 2017/038240 A1 | 3/2017 |
| WO | 2018/150978 A1 | 8/2018 |

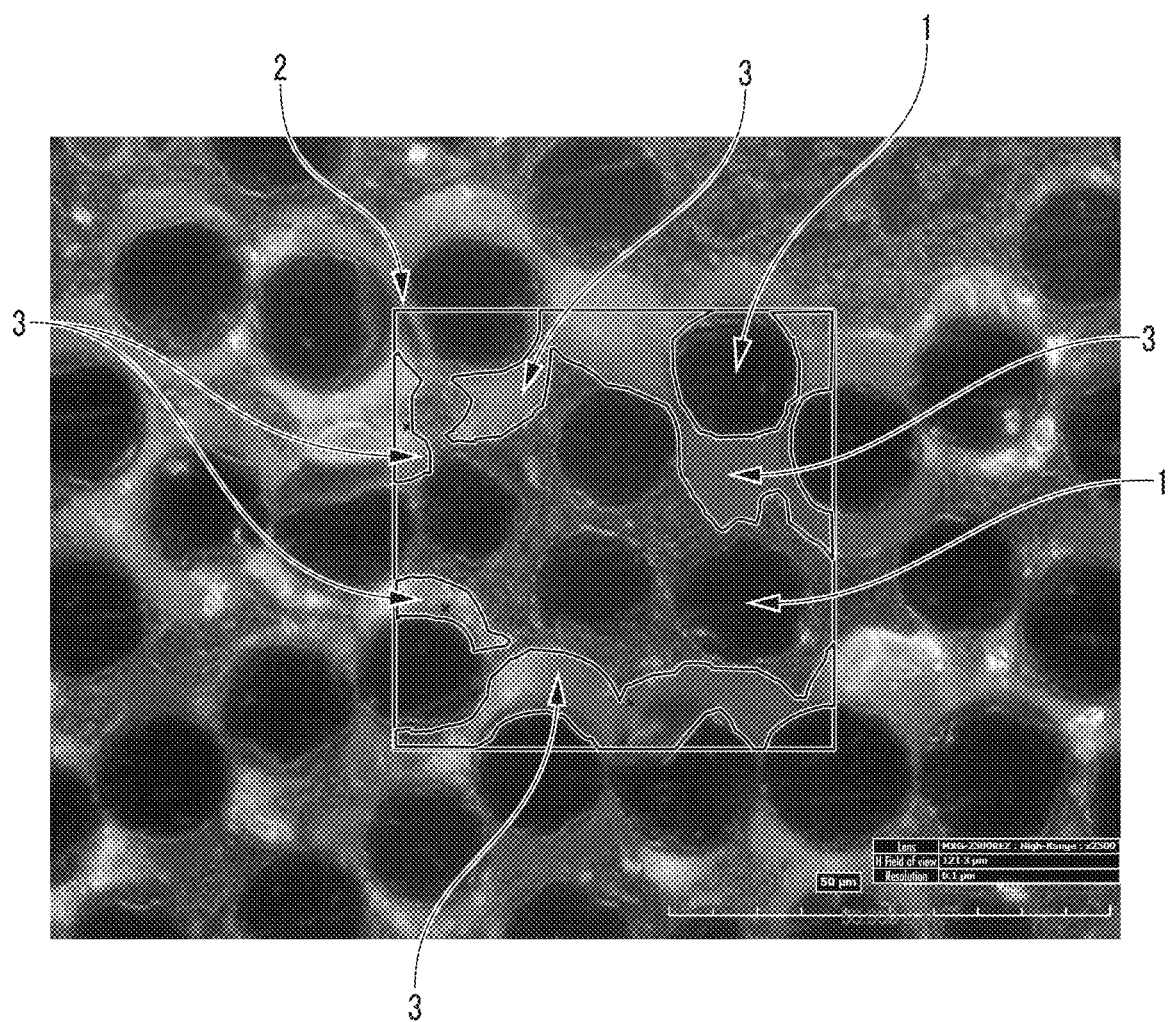

GLASS FIBER-REINFORCED RESIN MOLDED ARTICLE, HOUSING OF ELECTRONIC DEVICE, INTERIOR COMPONENT FOR MOBILITY PRODUCT AND EXTERIOR COMPONENT FOR MOBILITY PRODUCT

TECHNICAL FIELD

The present invention relates to a glass fiber-reinforced resin molded article, an electronic device housing, an interior component for a mobility product, and an exterior component for a mobility product.

BACKGROUND ART

Conventionally, glass fiber fabrics have been widely used to impart strength, rigidity, insulation properties, non-flammability, and the like to resin materials in a sheet form.

In recent years, an entirely transparent glass fiber-reinforced resin molded article (transparent composite sheet) has been suggested, in which a transparent resin is combined with a glass fiber fabric having a refractive index close to that of the transparent resin to thereby lower the visibility of the glass fiber fabric in the transparent resin (see, e.g., Patent Literature 1).

CITATION LIST

Patent Literature

Patent Literature 1: Japanese Patent Laid-Open No. 2005-319746

SUMMARY OF INVENTION

Technical Problem

The present inventors have found that there is an inconvenience in that, in spite of unique aesthetic present in the woven design of a glass fiber fabric, no weave pattern of the glass fiber fabric is visible in the composite transparent sheet, and the designability intrinsically comprised by a glass fiber fabric is compromised.

The present inventors also have found that, in the case where insufficient impregnation of a glass fiber fabric with a transparent resin disadvantageously occurs on preparing a transparent composite sheet, there occurs an inconvenience in that the weave pattern of the glass fiber fabric can be observed in a portion insufficiently impregnated with the transparent resin, but the reinforcing effect of the glass fiber fabric on a glass fiber-reinforced resin molded article is lost The present invention has been made in view of the above situation, and an object thereof is to provide a glass fiber-reinforced resin molded article in which the weave pattern of a glass fiber fabric is visible, the designability comprised by the glass fiber fabric is exerted, and the glass fiber fabric exerts a sufficient reinforcing effect.

Solution to Problem

In order to achieve the object, a glass fiber-reinforced resin molded article of the present invention is a glass fiber-reinforced resin molded article comprising a glass fiber fabric and a transparent resin, wherein the resin unimpregnation ratio in proximity to filament of the glass fiber fabric is in the range of more than 2.0% and 50.0% or less, the warp yarn width Bt and the weft yarn width By of the glass fiber fabric each are in the range of 0.50 nam to 8.50 mm, the warp yarn weaving density Wt and the weft yarn weaving density Wy of the glass fiber fabric each are in the range of 3.0 yarns/25 mm to 50.0 yarns/25 mm, and the degree of widening of warp yarn Et calculated by Bt/(25/Wt) and the degree of widening of weft yarn Ey calculated by By/(25/Wy) of the glass fiber fabric each are in the range of 0.70 to 1.10.

According to the glass fiber-reinforced resin molded article of the present invention, when the resin unimpregnation ratio in proximity to filament of the glass fiber fabric is in the range of more than 2.0% and 50.0% or less and the Bt, By, Wt, Wy, Et, and Ey each are in the range described above, the weave pattern of the glass fiber fabric is visible, the designability comprised by the glass fiber fabric is exerted, and the glass fiber fabric exerts a sufficient reinforcing effect. "The glass fiber fabric exerts a sufficient reinforcing effect" herein means that the flexural modulus of the glass fiber-reinforced resin molded article is 10 GPa or more.

The average resin unimpregnation ratio in proximity to filament of the glass fiber fabric can be measured by the following method. First, a glass fiber-reinforced resin molded article is cut using a diamond cutter, a fretsaw, or the like, and the cut surface is mechanically polished to prepare a measurement sample. Then, as shown in FIG. 1, a digital microscope (manufactured by Hirox Co., Ltd., model designation: KH-8700) is used to image the polished surface of the measurement sample at a magnification of 2500 times. The image obtained is subjected to binarization processing using image processing software WinRooF 2013 such that glass filaments 1 appear black. Then, a measurement region 2 including 5 to 20 of the glass filaments 1 is defined. Then, the image processing software WinRooF 2013 is used to identify the white portions in the measurement region as void portions 3, and the area of each of the void portions 3 is determined. Then, the resin unimpregnation ratio in proximity to filament of the measurement region 2 is determined by: resin unimpregnation ratio in proximity to filament (%)=(total area of void portions 3)/(area of measurement region 2)×100. Then, at least five measurement regions 2, which each include a different number of glass filaments and do not overlap one another, are defined. The resin unimpregnation ratio in proximity to filament is measured in each of the measurement regions 2, and the measurements are averaged to determine the average resin unimpregnation ratio in proximity to filament The flexural modulus of the glass fiber-reinforced resin molded article can be measured using a precision universal tester (manufactured by Shimadzu Corporation, model designation: AG-X Plus 50KN) in compliance with JIS K 7017:1999.

The glass fiber-reinforced resin molded article of the present invention preferably has a resin unimpregnation ratio in proximity to filament of the glass fiber fabric in the range of 2.1% or more and 28.0% or less.

According to the glass fiber-reinforced resin molded article of the present invention, when the resin unimpregnation ratio in proximity to filament of the glass fiber fabric is in the range of 2.1% or more and 28.0% or less, the glass fiber fabric exerts an excellent reinforcing effect "The glass fiber fabric exerts an excellent reinforcing effect" herein means that the flexural modulus of the glass fiber-reinforced resin molded article is 15 GPa or more.

The glass fiber-reinforced resin molded article of the present invention preferably has a resin unimpregnation ratio in proximity to filament of the glass fiber fabric in the range of 2.5% or more and 10.0% or less.

According to the glass fiber-reinforced resin molded article of the present invention, when the resin unimpregnation ratio in proximity to filament of the glass fiber fabric is in the range of 2.5% or more and 10.0% or less, the glass fiber fabric exerts a more excellent reinforcing effect "The glass fiber fabric exerts a more excellent reinforcing effect" herein means that the flexural modulus of the glass fiber-reinforced resin molded article is 18 GPa or more.

The glass fiber-reinforced resin molded article of the present invention preferably has a resin unimpregnation ratio in proximity to filament of the glass fiber fabric in the range of 3.1% or more and 5.0% or less.

According to the glass fiber-reinforced resin molded article of the present invention, when the resin unimpregnation ratio in proximity to filament of the glass fiber fabric is in the range of 3.1% or more and 5.0% or less, the glass fiber fabric exerts a further excellent reinforcing effect. "The glass fiber fabric exerts a further excellent reinforcing effect" herein means that the flexural modulus of the glass fiber-reinforced resin molded article is 20 GPa or more.

The glass fiber-reinforced resin molded article of the present invention preferably has a warp yarn mass (mass per unit length) of the glass fiber fabric and a weft yarn mass (mass per unit length) thereof each in the range of 210 tex to 850 tex. Note that 1 tex corresponds to 1 g/1000 m.

According to the glass fiber-reinforced resin molded article of the present invention, when the warp yarn mass and weft yarn mass of the glass fiber fabric each are in the range of 210 tex to 850 tex, the designability comprised by the glass fiber fabric is further exerted, and also the smoothness of the glass fiber-reinforced resin molded article becomes excellent. "The smoothness of the glass fiber-reinforced resin molded article becomes excellent" herein means that the center average roughness Ra of the surface of the glass fiber-reinforced resin molded article is 1 μm or less.

The center average roughness Ra of the surface of the glass fiber-reinforced resin molded article can be measured using a surface roughness tester (manufactured by Mitutoyo Corporation, model designation: J-47-2-0130) in compliance with JIS B 0601:2013.

The glass fiber-reinforced resin molded article of the present invention preferably has a dielectric constant of the glass fiber constituting the warp yarn and the weft yarn of the glass fiber fabric at a measurement frequency of 1 GHz of 5.5 or less.

According to the glass fiber-reinforced resin molded article of the present invention, when the dielectric constant of the glass fiber constituting the warp yarn and the weft yarn of the glass fiber fabric at a measurement frequency of 1 GHz is 5.5 or less, the glass fiber-reinforced resin molded article comprises excellent radio wave transmissivity.

In the glass fiber-reinforced resin molded article of the present invention, the glass composition of the glass fiber constituting the warp yarn and the weft yarn of the glass fiber fabric is preferably a glass composition including $SiO_2$ in the range of 60.0% by mass to 70.0% by mass, $Al_2O_3$ in the range of 20.0% by mass to 30.0% by mass, and MgO in the range of 5.0% by mass to 15.0% by mass with respect to the total amount of the glass fiber.

According to the glass fiber-reinforced resin molded article of the present invention, when the glass composition of the glass fiber constituting the warp yarn and the weft yarn of the glass fiber fabric is the glass composition described above, the glass fiber fabric exerts a particularly excellent reinforcing effect. "The glass fiber fabric exerts a particularly excellent reinforcing effect" herein means that the flexural modulus of the glass fiber-reinforced resin molded article is 24 GPa or more.

The electronic device housing of the present invention includes the glass fiber-reinforced resin molded article of the present invention.

According to the electronic device housing of the present invention, when including the glass fiber-reinforced resin molded article of the present invention, the electronic device housing comprises sufficient rigidity and excellent designability.

The interior component for a mobility product of the present invention includes the glass fiber-reinforced resin molded article of the present invention.

According to the interior component for a mobility product of the present invention, when including the glass fiber-reinforced resin molded article of the present invention, the interior component comprises sufficient rigidity and excellent designability.

The exterior component for a mobility product of the present invention includes the glass fiber-reinforced resin molded article of the present invention.

According to the exterior component for a mobility product of the present invention, when including the glass fiber-reinforced resin molded article of the present invention, the exterior component comprises sufficient rigidity and excellent designability.

BRIEF DESCRIPTION OF DRAWING

FIG. 1 illustrates a digital microscope image for explanation of the average resin unimpregnation ratio in proximity to filament.

DESCRIPTION OF EMBODIMENTS

Hereinafter, embodiments of the present invention will be described in detail.

A glass fiber-reinforced resin molded article of the present embodiment is a glass fiber-reinforced resin molded article comprising a glass fiber fabric and a transparent resin, wherein the average resin unimpregnation ratio in proximity to filament of the glass fiber fabric is in the range of more than 2.0% and 50.0% or less, the warp yarn width Bt and the weft yarn width By of the glass fiber fabric each are in the range of 0.50 mm to 8.50 mm, the warp yarn weaving density Wt and the weft yarn weaving density Wy of the glass fiber fabric each are in the range of 3.0 yarns/25 mm to 50.0 yarns/25 mm, and the degree of widening of warp yarn Et calculated by Bt/(25/Wt) and the degree of widening of weft yarn Ey calculated by By/(25/Wy) of the glass fiber fabric each are in the range of 0.70 to 1.10.

According to the glass fiber-reinforced resin molded article of the present embodiment, when the average resin unimpregnation ratio in proximity to filament of the glass fiber fabric is in the range of more than 2.0% and 50.0% or less and the Bt, By, Wt, Wy, Et, and Ey each are in the range described above, the weave pattern of the glass fiber fabric is visible, the designability comprised by the glass fiber fabric is exerted, and the glass fiber fabric exerts a sufficient reinforcing effect. "The glass fiber fabric exerts a sufficient reinforcing effect" herein means that the flexural modulus of the glass fiber-reinforced resin molded article is 10 GPa or more.

In the glass fiber-reinforced resin molded article of the present embodiment, when the average resin unimpregnation ratio in proximity to filament of the glass fiber fabric is 2.0% or less, the weave pattern of the glass fiber fabric is not visible in the state of a glass fiber-reinforced resin molded article, and thus the designability comprised by the glass fiber fabric is not exerted. Meanwhile, when the average resin unimpregnation ratio in proximity to filament of the glass fiber fabric is more than 50.0%, the reinforcing effect of the glass fiber fabric is not sufficiently exerted.

In the glass fiber-reinforced resin molded article of the present embodiment, the average resin unimpregnation ratio in proximity to filament of the glass fiber fabric is preferably in the range of 2.1% or more and 28.0% or less because the glass fiber fabric exerts a more excellent reinforcing effect. The average resin unimpregnation ratio in proximity to filament of the glass fiber fabric is more preferably in the range of 2.5% or more and 10.0% or less because the glass fiber fabric exerts a more excellent reinforcing effect. The average resin unimpregnation ratio in proximity to filament of the glass fiber fabric is further preferably in the range of 3.1% or more and 5.0% or less because the glass fiber fabric exerts a further excellent reinforcing effect. The average resin unimpregnation ratio in proximity to filament of the glass fiber fabric is particularly preferably in the range of 3.1% or more and 4.0% or less, especially preferably in the range of 3.1% or more and 3.9% or less, extremely preferably in the range of 3.1% or more and 3.7% or less, and most preferably in the range of 3.1% or more and 3.4% or less because the glass fiber fabric more certainly exerts a further excellent reinforcing effect.

The resin unimpregnation ratio in proximity to filament of the glass fiber fabric can be controlled by the amounts of a silane coupling agent and a dye or pigment other than the silane coupling agent attached to the surface of the glass fiber fabric. When the amount of the silane coupling agent attached to the surface of the glass fiber fabric is increased and the amount of the dye or pigment other than the silane coupling agent attached thereto is reduced, the average resin unimpregnation ratio in proximity to filament of the glass fiber fabric can be lowered. In the glass fiber-reinforced resin molded article of the present embodiment, an exemplary amount of the silane coupling agent attached to the glass fiber fabric surface can be 0.03% by mass or less, and an exemplary amount of dye or pigment attached thereto can be 1.0% by mass or less.

In the glass fiber-reinforced resin molded article of the present embodiment, when the warp yarn width Bt and the weft yarn width By of the glass fiber fabric each are less than 0.50 nam or more than 8.50 mm, the designability comprised by the glass fiber fabric becomes insufficient In the glass fiber-reinforced resin molded article of the present embodiment, in order for the glass fiber fabric to more certainly comprise the designability, the warp yarn width Bt and the weft yarn width By of the glass fiber fabric each are preferably in the range of 0.80 nam to 4.80 mm, more preferably in the range of 1.60 mm to 3.30 mm, and further preferably in the range of 1.70 mm to 2.30 mm.

The yarn widths Bt and By can be determined by the following method. First, a digital microscope (manufactured by Hirox Co., Ltd., model designation: KH-8700) is used to image the surface of the glass fiber-reinforced resin molded article at a magnification of 35 to 100 times. Then, with the resulting images, using image processing software WinRooF 2013, at least five warp (weft) yarns are chosen from one or a plurality of the images. For each warp (weft) yarn, at least five warp (weft) yarn widths are measured in a region in which weft (warp) yarns are present below the warp (weft) yarn from one or a plurality of the images. Calculating the average of the warp (weft) yarn widths measured in one of the images enables Bt (By) to be determined.

In the glass fiber-reinforced resin molded article of the present embodiment, the yarn widths Bt and By of the glass fiber fabric can be controlled by adjusting, for example, whether the warp yarn and the weft yarn are rewound or not and rewinding conditions, conditions of tension to be applied on the warp yarn and conditions for filling the weft yarn on weaving the glass fiber fabric, conditions for opening treatment using high pressure water streams, ultrasonication, or the like on the glass fiber fabric, which may be performed after the glass fiber fabric is woven, and press conditions on producing the glass fiber-reinforced resin molded article. For example, when opening treatment is performed with high pressure water streams, use of a high water stream pressure in the range of 0.1 MPa to 4.0 MPa enables Bt and By to be larger.

In the glass fiber-reinforced resin molded article of the present embodiment, the ratio of By to Bt (By/Bt) is, for example in the range of 0.90 to 1.30, preferably in the range of 1.00 to 1.20, and further preferably in the range of 1.00 to 1.05.

In the glass fiber-reinforced resin molded article of the present embodiment, when the warp yarn weaving density Wt and weft yarn weaving density Wy of the glass fiber fabric each are less than 3.0 yarns/25 mm or more than 50.0 yarns/25 mm, the designability comprised by the glass fiber fabric becomes insufficient.

In the glass fiber-reinforced resin molded article of the present embodiment, in order for the glass fiber fabric to comprise the designability more certainly, the warp yarn weaving density Wt and the weft yarn weaving density Wy of the glass fiber fabric each are preferably in the range of 5.0 yarns/25 mm to 25.0 yarns/25 mm, more preferably in the range of 7.0 yarns/25 mm to 19.0 yarns/25 mm, further preferably in the range of 7.5 yarns/25 mm to 17.0 yarns/25 mm, particularly preferably in the range of 8.0 yarns/25 mm to 16.0 yarns/25 mm, and particularly preferably in the range of 11.0 yarns/25 mm to 14.0 yarns/25 mm The Wt and Wy can be determined by the following method. First, the surface of the glass fiber-reinforced resin molded article is observed using a scale loupe 6 times-$\phi 30$ (manufactured by KOKUYO Co., Ltd.). At least five 25-mm regions in the weft (warp) yarn direction are defined, and the number of the warp (weft) yarns present in each of the regions is visually counted. Then, calculation of the average of the number of the warp (weft) yarns visually counted can determine the Wt(Wy).

In the glass fiber-reinforced resin molded article of the present embodiment, the ratio of Wy to Wt (Wy/Wt) is, for example, in the range of 0.85 to 1.20, preferably in the range of 0.95 to 1.15, further preferably in the range of 1.00 to 1.10, and particularly preferably in the range of 1.00 to 1.05.

In the glass fiber-reinforced resin molded article of the present embodiment, when the degree of widening of warp yarn Et calculated by Bt/(25/Wt) and the degree of widening of weft yarn Ey calculated by By/(25/Wy), based on the Bt, By, Wt, and Wy, each are less than 0.70, unevenness given by the weave pattern of the glass fiber fabric is reduced due to voids present among warp yarns and among weft yarns in the glass fiber fabric, and the aesthetic caused by reflected light due to the unevenness is compromised. In addition, the presence of the gaps prevents the regular arrangement of the weave pattern of the glass fiber fabric, and thus, the glass fiber fabric fails to sufficiently exert designability. Meanwhile, when the Et and Ey each are more than 1.10, unevenness given by the weave pattern of the glass fiber fabric is reduced, due to overlap of warp yarns and overlap of weft yarns in the glass fiber fabric, and the aesthetic caused by reflected light due to the unevenness is compromised. In addition, the weave pattern of the glass fiber fabric is no longer regularly arranged, and thus, the glass fiber fabric cannot sufficiently exert designability in the glass fiber-reinforced resin molded article.

In the glass fiber-reinforced resin molded article of the present embodiment, in order for the glass fiber fabric to more certainly exert designability, the Et is preferably in the range of 0.75 to 1.08, more preferably in the range of 0.90 to 1.07, further preferably in the range of 0.93 to 1.06, and particularly preferably in the range of 0.95 to 1.05. Also, the Ey is preferably in the range of 0.85 to 1.08, more preferably in the range of 0.90 to 1.07, further preferably in the range of 0.95 to 1.06, and particularly preferably in the range of 1.00 to 1.05.

In the glass fiber-reinforced resin molded article of the present embodiment, the Et and Ey can be controlled by adjusting Bt and By according to the method described above.

In the glass fiber-reinforced resin molded article of the present embodiment, the glass composition of the glass fiber constituting the warp yarn and the weft yarn of the glass fiber fabric is not particularly limited. Examples of the glass composition that may be taken by the glass fiber include the most common E glass composition (composition including $SiO_2$ in the range of 52.0% by mass to 56.0% by mass, $Al_2O_3$ in the range of 12.0% by mass to 16.0% by mass, MgO and CaO in the range of 20.0% by mass to 25.0% by mass in total, and $B_2O_3$ in the range of 5.0% by mass to 10.0% by mass, converted in terms of oxide, with respect to the total amount of the glass fiber), a high strength and high modulus glass composition (composition including $SiO_2$ in the range of 60.0% by mass to 70.0% by mass, $Al_2O_3$ in the range of 20.0% by mass to 30.0% by mass, and MgO in the range of 5.0% by mass to 15.0% by mass, with respect to the total amount of the glass fiber), a high modulus and easily-producible glass composition (composition including $SiO_2$ in the range of 57.0% by mass to 60.0% by mass, $Al_2O_3$ in the range of 17.5% by mass to 20.0% by mass, MgO in the range of 8.5% by mass to 12.0% by mass, CaO in the range of 10.0% by mass to 13.0% by mass, and $B_2O_3$ in the range of 0.5% by mass to 1.5% by mass, and including $SiO_2$, $Al_2O_3$, MgO, and CaO of 98.0% by mass or more in total, with respect to the total amount of the glass fiber), and a low dielectric constant and low dielectric tangent glass composition (composition including $SiO_2$ in the range of 48.0% by mass to 62.0% by mass, $B_2O_3$ in the range of 17.0% by mass to 26.0% by mass, $Al_2O_3$ in the range of 9.0% by mass to 18.0% by mass, CaO in the range of 0.1% by mass to 9.0% by mass, MgO in the range of 0% by mass to 6.0% by mass, $Na_2O$, $1(_2O$, and $Li_2O$ in the range of 0.05% by mass to 0.5% by mass in total, $TiO_2$ in the range of 0% by mass to 5.0% by mass, SrO in the range of 0% by mass to 6.0% by mass, $F_2$ and $Cl_2$ in the range of 0% by mass to 3.0% by mass in total, and $P_2O_5$ in the range of 0% by mass to 6.0% by mass, with respect to the total amount of the glass fiber).

In the glass fiber-reinforced resin molded article of the present embodiment, the glass composition of the glass fiber constituting the warp yarn and the weft yarn of the glass fiber fabric is preferably a high strength and high modulus glass composition (composition including $SiO_2$ in the range of 60.0% by mass to 70.0% by mass, $Al_2O_3$ in the range of 20.0% by mass to 30.0% by mass, and MgO in the range of 5.0% by mass to 15.0% by mass, with respect to the total amount of the glass fiber) because the glass fiber fabric exerts a particularly excellent reinforcing effect.

In the glass fiber constituting the warp yarn and the weft yarn of the glass fiber fabric, the content of each component described above in the glass fiber included in the glass fiber-reinforced resin molded article of the present embodiment, the content of Li as the light element can be measured with an ICP emission spectroscopic analyzer, and the contents of the other elements can be measured with a wavelength dispersive X-ray fluorescence analyzer.

In the measurement method, first, the glass fiber-reinforced resin molded article is heated in a muffle furnace, for example, at 300° C. to 650° C. for about 2 hours to 24 hours to remove the transparent resin and take out the glass fiber fabric. The glass fiber fabric taken out is pulverized. Then, the obtained pulverized product is placed in a platinum crucible and melted with stirring while being held at a temperature of 1550° C. for 6 hours in an electric furnace to obtain a homogeneous molten glass. Next, the obtained molten glass is poured onto a carbon plate to produce glass cullet, and then pulverized into powder. Regarding Li as a light element, glass powder is thermally decomposed with an acid and then quantitatively analyzed using an ICP emission spectroscopic analyzer. Regarding other elements, glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content (% by mass) of each component can be determined from these numerical values.

In the glass fiber-reinforced resin molded article of the present embodiment, the glass fiber constituting the warp yarn and the weft yarn of the glass fiber fabric has an intrinsic dielectric constant in accordance with its glass composition. In the glass fiber constituting the warp yarn and the weft yarn of the glass fiber fabric, the dielectric constant at a measurement frequency of 1 GHz is preferably 5.5 or less and more preferably 5.0 or less because the glass fiber-reinforced resin molded article comprises excellent radio wave transmissivity.

The dielectric constant at a measurement frequency of 1 GHz of the glass fiber constituting the warp yarn and the weft yarn of the glass fiber fabric can be determined by the following method. First, a glass fiber-reinforced resin molded article of at least 20 g is heated in a muffle furnace, for example, at 300° C. to 650° C. for about 2 hours to 24 hours to remove the transparent resin and take out the glass fiber fabric. The glass fiber fabric taken out is pulverized. Then, the obtained pulverized product is placed in a platinum crucible and melted with stirring while being held at a temperature of 1550° C. for 6 hours in an electric furnace to obtain a homogeneous molten glass. Next, the obtained molten glass is poured onto a carbon plate and polished to obtain a disk-shaped glass having a diameter of 40 mm and a thickness of 1 mm to 1.5 mm. Then, the dielectric constant is measured using the obtained disk-shaped glass at a measurement frequency of 1 GHz in compliance with an ASTM test method, D150 "Standard Test Methods for A-C Loss Characteristics and Permittivity (Dielectric Constant) of Solid Electrical Insulation". This can determine the dielectric constant at a measurement frequency of 1 GHz of the glass fiber constituting the warp yarn and the weft yarn of the glass fiber fabric.

In the glass fiber-reinforced resin molded article of the present embodiment, the warp yarn and the weft yarn of the glass fiber fabric are produced as follows. First, a glass raw material (glass batch) prepared to have the above composition, based on the content of components included in ores to be the glass raw material and each component and the amount of each component volatilized in the melting process, is supplied to a melting furnace and melted at a temperature in the range of 1450° C. to 1550° C., for example. Then, the melted glass batch (melted glass) is drawn from 50 to 8000 nozzle tips of a bushing controlled at a predetermined temperature and rapidly cooled to form glass filaments. Subsequently, the glass filaments formed are applied with a sizing agent or binder using an applicator as an application apparatus. While 50 to 8000 of the glass filaments are bundled using a bundling shoe, the glass filaments are wound on a tube at a high speed using a winding apparatus to obtain a warp yarn or weft yarn. Alternatively, the melted glass is drawn from 50 to 8000 nozzle tips of a bushing and rapidly cooled to form glass filaments. The glass filaments are applied with a sizing agent or binder. Then, 50 to 8000 of the glass filaments are bundled and wound on a tube to obtain a glass fiber strand. While unraveled from the tube, 2 to 20 of these glass fiber strands are aligned to also obtain a warp yarn or weft yarn.

In the glass fiber-reinforced resin molded article of the present embodiment, the filament diameter of each of the glass filaments constituting the warp yarn and the weft yarn of the glass fiber fabric is, for example, in the range of 3.0 µm to 30.0 µm and preferably in the range of 6.5 µm to 18.0 µm.

In the glass fiber-reinforced resin molded article of the present embodiment, the number of glass filaments constituting the warp yarn and the weft yarn of the glass fiber fabric is, for example, in the range of 200 to 4000 and preferably in the range of 800 to 2000.

In the glass fiber-reinforced resin molded article of the present embodiment, the filament diameter for the warp yarn or weft yarn is the average value of measurements, which are obtained when the glass fiber-reinforced resin molded article is heated in a muffle furnace, for example, at 300° C. to 650° C. for about 2 hours to 24 hours to remove the transparent resin and take out the glass fiber fabric, and using the glass fiber fabric taken out, the diameter of the glass filaments constituting the warp yarn or the weft yarn is measured at 50 cut surfaces of each of the warp yarn or the weft yarn by scanning electron microscope (manufactured by Hitachi High-Technologies Corporation, trade name: S-3400N, magnification: 3000 times). The number of glass filaments constituting the warp yarn or the weft yarn is the average value of measurements, which are obtained when the number of glass filaments constituting the warp yarn or the weft yarn is measured at 50 cut surface of each of the warp yarn or the weft yarn by scanning electron microscope (manufactured by Hitachi High-Technologies Corporation, trade name: S-3400N, magnification: 500 times).

In the glass fiber-reinforced resin molded article of the present embodiment, the mass of the warp yarn and the weft yarn of the glass fiber fabric is, for example, in the range of 120 tex to 1200 tex. Since the designability comprised by the glass fiber fabric is more exerted and the smoothness of the glass fiber-reinforced resin molded article becomes excellent, the mass is preferably in the range of 210 tex to 850 tex, more preferably in the range of 220 tex to 750 tex, further preferably in the range of 230 tex to 700 tex, particularly preferably in the range of 240 tex to 650 tex, especially preferably in the range of 250 tex to 500 tex, extremely preferably in the range of 260 tex to 440 tex, and most preferably in the range of 270 tex to 390 tex.

In the glass fiber-reinforced resin molded article of the present embodiment, in order to determine the mass of the warp yarn and the weft yarn of the glass fiber fabric, the glass fiber-reinforced resin molded article is heated in a muffle furnace, for example, at 300° C. to 650° C. for about 2 hours to 24 hours to remove the transparent resin and take out the glass fiber fabric. The glass fiber fabric taken out can be used for measurement in compliance with JIS R 3420: 2013 to determine the mass.

In the glass fiber-reinforced resin molded article of the present embodiment, the warp yarn and the weft yarn of the glass fiber fabric may be twisted in the range of 0.01 twists/25 mm to 4.0 twists/25 mm.

In order to determine the number of twists of the warp yarn or the weft yarn, the glass fiber-reinforced resin molded article is heated in a muffle furnace, for example, at 300° C. to 650° C. for about 2 hours to 24 hours to remove the transparent resin and take out the glass fiber fabric. Using the glass fiber fabric taken out, in compliance with JIS R 3912, the number of turns required for detwisting a specimen and the length of the specimen under a standard tension before detwisting are determined using a twist tester, and the number of twists can be calculated from the determined values.

In the glass fiber-reinforced resin molded article of the present embodiment, the glass fiber fabric can be produced by weaving the warp yarn and the weft yarn described above with a known loom such as a rapier loom under known conditions so as to achieve the weaving density described above.

In the glass fiber-reinforced resin molded article of the present embodiment, the Bt and By of the glass fiber fabric can be adjusted by rewinding the warp yarn and the weft yarn before weaving using a rewinding apparatus. In order to achieve desired values of the Bt and By, the glass fiber fabric after weaving can be subjected to, for example, opening treatment by means of water flow pressure, opening treatment by means of high-frequency vibration using liquid as a medium, opening treatment by means of the pressure of a fluid having a surface pressure, or opening treatment by means of pressing with a roll.

In the glass fiber-reinforced resin molded article of the present embodiment, in order to adjust the average resin unimpregnation ratio in proximity to filament of the glass fiber fabric, the glass fiber fabric after weaving is heated while the heating temperature is adjusted in the range of 200° C. to 650° C. and the heating time is adjusted in the range of 2 hours to 24 hours. This heating incinerates the silane coupling agent contained in the sizing agent or binder attached to the warp yarn and the weft yarn, and thereby the amount of the glass fiber fabric attached to the surface of the glass fiber fabric can be reduced to a desired amount. The glass fiber fabric after incineration of the silane coupling agent contained in the sizing agent or binder attached to the warp yarn and the weft yarn is immersed in a silane coupling agent solution while the silane coupling agent concentration and immersion time are adjusted, and thereby the amount of the silane coupling agent attached to the surface of the glass fiber fabric can be controlled to a desired value.

In the glass fiber-reinforced resin molded article of the present embodiment, the glass fiber fabric can be colored by immersion in a solution containing a dye or pigment.

In the glass fiber-reinforced resin molded article of the present embodiment, the woven structure of the glass fiber fabric is not particularly limited, and plain weaving, satin weaving, twill weaving, or the like may be employed. On producing the glass fiber-reinforced resin molded article, the woven structure of the glass fiber fabric is preferably plain weaving, from the viewpoint that occurrence of yarn slippage in the glass fiber fabric can be reduced.

In the glass fiber-reinforced resin molded article of the present embodiment, the mass per unit area of the glass fiber fabric is, for example, in the range of 150 g/m² to 800 g/m², preferably in the range of 210 g/m² to 650 g/m², more preferably in the range of 240 g/m² to 500 g/m², further preferably in the range of 260 g/m² to 390 g/m², and particularly preferably in the range of 265 to 340 g/m².

In the glass fiber-reinforced resin molded article of the present embodiment, in order to determine the mass per unit area of the glass fiber fabric, the glass fiber-reinforced resin molded article is heated in a muffle furnace, for example, at 300° C. to 650° C. for about 2 hours to 24 hours to remove the transparent resin and take out the glass fiber fabric. Using the glass fiber fabric taken out, the mass of three glass cloths cut into a size of 200 mm×200 mm is measured with a balance in compliance with JIS R 3420, and the average value of the values obtained by converting each of the masses in terms of mass per 1 m² is taken as the mass per unit area of the glass fiber fabric.

In the glass fiber-reinforced resin molded article of the present embodiment, the thickness of the glass fiber fabric is, for example, in the range of 150 μm to 900 μm, preferably in the range of 250 μm to 700 μm, and more preferably in the range of 350 μm to 500 μm.

In the glass fiber-reinforced resin molded article of the present embodiment, in order to determine the thickness of the glass fiber fabric, the glass fiber-reinforced resin molded article is heated in a muffle furnace, for example, at 300° C. to 650° C. for about 2 hours to 24 hours to remove the transparent resin and take out the glass fiber fabric. Using the glass fiber fabric taken out, the thickness is measured at 15 points in the glass cloth with a micrometer in compliance with JIS R 3420. The average value of the measurements is taken as the thickness of the glass fiber fabric.

In the glass fiber-reinforced resin molded article of the present embodiment, the amount of the silane coupling agent attached to the surface of the glass fiber fabric, is, for example, 0.03% by mass or less and preferably 0.02% by mass or less based on the mass of the glass fiber fabric to the surface of which organic matter or the like is not attached.

Examples of the silane coupling agent include aminosilanes, vinylsilanes, epoxysilanes, methacrylsilanes, cationic silanes, acrylsilanes, phenylsilanes, halogenosilanes, ureidosilanes, mercaptosilanes, sulfidesilanes, isocyanatosilane, isocyanuratesilanes, and styrylsilanes. As the silane coupling agent, these can be used singly or in combination of two or more.

Examples of the aminosilanes include 3-aminopropyltrimethoxysilane, 3-aminopropyltriethoxysilane, 3-(2-aminoethyl)aminopropyltrimethoxysilane, ureidopropyltrimethoxysilane, ureidopropyltriethoxysilane, N-2-(aminoethyl)-3-aminopropyltrimethoxysilane, and N-2-(aminoethyl)-3-aminopropylmethyldimethoxysilane.

Examples of the vinylsilanes include vinyltrimethoxysilane, vinyltriethoxysilane, vinylacetoxysilane, allyltrimethoxysilane, 3-methacryloxypropyltrimethoxysilane, 3-methacryloxypropyltriethoxysilane, 3-methacryloxypropylmethyldimethoxysilane, 3-methacryloxypropylmethyldiethoxysilane, and 3-acryloxypropyltrimethoxysilane.

Examples of the epoxysilanes include 3-glycidoxypropyltrimethoxysilane, 3-glycidoxypropyltriethoxysilane, 3-glycidoxypropylmethyldimethoxysilane, 3-glycidoxypropylmethyldiethoxysilane, and 2-(3,4-epoxycyclohexyl)ethyltrimethoxysilane.

Examples of the methacrylsilanes include 3-methacryloxypropylmethyldimethoxysilane, 3-methacryloxypropyltrimethoxysilane, 3-methacryloxypropylmethyldiethoxysilane, and 3-methacryloxypropyltriethoxysilane Examples of the cationic silanes include N-13-(N-vinylbenzylaminoethyl)-γ-aminopropyltrimethoxysilane hydrochloride, N-2-(aminoethyl)-3-aminopropylmethyldimethoxysilane hydrochloride, N-2-(aminoethyl)-3-aminopropyltrimethoxysilane hydrochloride, 3-aminopropyltrimethoxysilane hydrochloride, 3-aminopropyltriethoxysilane hydrochloride, 3-triethoxysilyl-N-(1,3-dimethyl-butylidene)propylamine hydrochloride, and N-phenyl-3-aminopropyltrimethoxysilane hydrochloride.

Examples of the acrylsilanes include 3-acryloxypropyltrimethoxysilane.

Examples of the phenylsilanes include trimethoxyphenylsilane and triethoxyphenylsilane Examples of the halogenosilanes include (3-chloropropyl)trimethoxysilane and (3-chloropropyl)triethoxysilane Examples of the ureidosilanes include 3-ureidopropyltriethoxysilane.

Examples of the mercaptosilanes include γ-mercaptopropyltrimethoxysilane

Examples of the sulfidesilanes include bis(3-(triethoxysilyl)propyl)disulfide or bis(3-(triethoxysilyl)propyl)tetrasulfide.

Examples of the isocyanatesilanes include 3-isocyanatepropyltriethoxysilane.

Examples of the isocyanuratesilanes include tris(trimethoxysilylpropyl)isocyanurate.

Examples of the styrylsilanes include styryltrimethoxysilane

In the glass fiber-reinforced resin molded article of the present embodiment, the glass fiber fabric is usually white, but may be colored black, gold, silver, blue, or red with a dye or pigment. The amount of the dye or pigment attached to the surface of the glass fiber fabric is 1.0% by mass or less, for example, based on the weight of the glass fiber fabric.

Examples of the dye or pigment include carbon black, titanium oxide, zinc oxide, iron oxide, chromium oxide, synthesized silica, calcined pigment, and zinc sulfide.

In the glass fiber-reinforced resin molded article of the present embodiment, design, pattern, images, characters, numerals or the like can be printed on the surface of the glass fiber fabric. However, in order to maximize the aesthetic of the woven design of the glass fiber fabric, it is preferred that none of design, pattern, images, characters, numerals or the like is printed on the surface of the glass fiber fabric.

In the glass fiber-reinforced resin molded article of the present embodiment, the transparent resin means a resin having a total light transmittance of 85% or more, as measured in compliance with JIS K 7375:2008. Examples of the transparent resin include curable resins such as epoxy resins, unsaturated polyester resins, vinyl ester resins, polyisocyanate resins, and polyimide resins, and thermoplastic resins such as polystyrene resins, acrylonitrile butadiene styrene (ABS) resins, (meth)acryl resins, polyacetal resins, polyethylene terephthalate (PET) resins, polycarbonate resins, and polyarylate (PAR) resins.

The glass fiber-reinforced resin molded article of the present embodiment, in the case in which the transparent resin is a curable resin, can be obtained by impregnating the glass fiber fabric with the curable resin and curing or semi-curing the curable resin by thermal curing or photo-curing, using a press molding method, hand lay-up method, continuous panel molding method, infusion molding method, RTM molding method, or the like. Use of the press molding method on a glass fiber-reinforced resin molded article including the curable resin in a semi-cured state (prepreg) also enables the glass fiber-reinforced resin molded article to be obtained. The glass fiber-reinforced resin molded article of the present embodiment, in the case in which the transparent resin is a thermoplastic resin, can be obtained by using a press molding method, a double belt type continuous press molding method, or the like on a laminate of a thermoplastic resin film and the glass fiber fabric.

In the glass fiber-reinforced resin molded article of the present embodiment, a sheet of the glass fiber fabric may be used singly, or 2 to 5 sheets thereof may be used in lamination. Alternatively, one or more sheets of the glass fiber fabric may be disposed as a surface layer portion, and a reinforced fiber fabric other than the glass fiber fabric may be laminated for use as a lower layer portion, which is below the glass fiber fabric.

In the glass fiber-reinforced resin molded article of the present embodiment, the proportion of the glass fiber fabric (when a plurality of sheets of the glass fiber fabric is included, the total amount thereof) based on the total amount of the article (hereinafter, this proportion is sometimes referred to as the glass content) is, for example, in the range of 55% by mass to 80% by mass, preferably in the range of 60% by mass to 78% by mass, and more preferably in the range of 65% by mass to 75% by mass. Here, the glass content can be calculated in compliance with JIS K 7052: 1999.

In the glass fiber-reinforced resin molded article of the present embodiment, the transparent resin may be a transparent resin composition including the transparent resin and additives. Examples of the additives include reinforcing fiber (e.g., glass fiber, carbon fiber, and metal fiber), a filler (e.g., glass powder, talc, and mica), a curing agent, a polymerization initiator, a flame retardant, an UV absorber, a heat stabilizer, an antioxidant, an antistatic agent, a fluidity improver, an anti-blocking agent, a lubricant, a nucleating agent, an antibacterial agent, and a pigment. These additives may be contained in the transparent resin composition in the range of 0.1 to 50.0% by mass based on the total amount of the resin composition.

The glass fiber-reinforced resin molded article of the present invention comprises sufficient rigidity and comprises excellent designability and thus can be suitably employed as an electronic device housing, an interior component for a mobility product, an exterior component for a mobility product, and the like.

Examples of the electronic device housing include smartphone housings, mobile personal computer housings, notebook computer housings, tablet housings, Wi-Fi router housings, smart speaker housings, television housings, monitor housings, and smart home appliance housings.

Examples of the interior components for a mobility product include automobile interior components, aircraft interior components, and interior components for railway vehicles.

Examples of the automobile interior components include a dash panel, a console box, and an air conditioner louver.

Examples of the aircraft interior components include wall material, a tray, a remote controller housing, and a screen housing.

Examples of the interior components for railway vehicles include wall material, a window frame, and ceiling material.

Examples of the exterior components for a mobility product include automobile exterior components and exterior components for railway vehicles.

Examples of the automobile exterior components include a fender, a door, a roof, a hood, and a spoiler.

Examples of the exterior components for railway vehicles include a vehicle outer plate.

Hereinafter, the present invention will be concretely explained with reference to Examples. However, the present invention is not limited to these Examples.

EXAMPLES

Example 1

A glass fiber yarn comprising a mass of 285 tex, comprising the glass composition A shown in Table 1, was used as the warp yarn and the weft yarn. The yarns were plain-woven using a rapier loom at a warp yarn weaving density Wt of 12.5 yarns/25 mm and a weft yarn weaving density Wy of 12.5 yarns/25 mm to thereby obtain a glass fiber fabric of 275 g/m². This glass fiber fabric was subjected to opening treatment with water flow pressure set at 1.0 MPa. Then, this glass fiber fabric, after heated at 600° C. for 2 hours, was immersed in a silane coupling agent aqueous solution including 3-aminopropyltriethoxysilane as a silane coupling agent such that the amount of the silane coupling agent attached reached 0.02% by mass.

Then, the glass fiber fabric was applied with an unsaturated polyester resin composition (designated as "polyester" in Table 2) as a transparent resin, and pressed at 100° C. and 20 MPa to obtain a glass fiber-reinforced resin molded article of Example 1. The unsaturated polyester resin composition includes 100 parts by mass of an unsaturated polyester resin (manufactured by Japan Composite Co., LTD., trade name: POLYHOPE 6339) and 2 parts by mass of a curing agent (manufactured by Tokyo Chemical Industry Co., Ltd., trade name: BPO), and the total light transmittance of the resin composition is 94%.

The glass fiber-reinforced resin molded article of Example 1 was measured by the methods described above for the average resin unimpregnation ratio in proximity to filament, warp yarn width Bt, weft yarn width By, and glass content, and the degree of widening of warp yarn Et and degree of widening of weft yarn Ey were calculated. The results are shown in Table 2.

The glass fiber-reinforced resin molded article of Example 1 was measured by the method described above also for the flexural modulus, and the weave pattern visibility, designability (weave pattern unevenness texture), surface smoothness, and radio wave transmissivity were evaluated by the methods described below. The results are shown in Table 2.

[Evaluation Method of Weave Pattern Visibility]

The glass fiber-reinforced resin molded article having a size of 10 cm×10 cm was visually observed. The number of glass fiber yarns that can be confirmed on reflection of light from the glass fiber yarns was counted. A case in which the proportion of the number of the glass fiber yarns counted based on the total number of the glass fiber yarns included in the glass fiber-reinforced resin molded article was 50% or more was evaluated "Visible", and a case in which proportion thereof was less than 50% was evaluated as "Not visible".

[Evaluation Method of Designability (Aesthetic Caused by Reflected Light)]

While the glass fiber-reinforced resin molded article was visually observed, the field of view was moved vertically (in the warp yarn direction) or horizontally (in the weft yarn direction). In each direction, a case in which movement of the reflected light following the movement of the field of view did not occur along the weave pattern of the glass fiber fabric disposed perpendicular to the movement of the field of view, and the aesthetic caused by the reflected light in the weave pattern was not compromised was evaluated as "A", a case in which movement of the reflected light following the movement of the field of view occurred along a portion of the weave pattern of the glass fiber fabric disposed perpendicular to the movement of the field of view, and the aesthetic caused by the reflected light in the weave pattern was slightly compromised was evaluated as "B", and a case in which movement of the reflected light following the movement of the field of view occurred along the weave pattern of the glass fiber fabric disposed perpendicular to the movement of the field of view, and the aesthetic caused by the reflected light in the weave pattern was compromised was evaluated as C.

[Evaluation Method of Surface Smoothness]

The center average roughness Ra of the surface of the glass fiber-reinforced resin molded article was measured using a surface roughness tester (manufactured by Mitutoyo Corporation, model designation: J?47?2?0130) in compliance with JIS B 0601:2013. A case of a center average roughness Ra of 1 μm or less was evaluated as "A", a case of a center average roughness Ra of more than 1 μm and 10 μm or less was evaluated as "B", and a case of a center average roughness Ra of more than 10 μm was evaluated as "C".

[Evaluation Method of Radio Wave Transmissibility]

A measurement specimen obtained by cutting the glass fiber-reinforced resin molded article to a size of 1.5 mm x 80 mm or larger was measured for the dielectric constant at a measurement frequency of 1 GHz using a network analyzer (manufactured by Agilent Technologies, trade name: PNA-L Network Analyzer N5230A) and a cavity resonator (manufactured by KANTO Electronic Application and Development Inc., model designation: CP431) in compliance with JIS C 2138:2007. A case of a dielectric constant of less than 5.0 was evaluated as "A", and a case of a dielectric constant of 5.0 or more was evaluated as "B".

Example 2

A glass fiber-reinforced resin molded article of Example 2 was obtained exactly in the same manner as in Example 1 except that a glass fiber yarn comprising a mass of 275 tex, comprising the glass composition B shown in Table 1, was employed as the warp yarn and the weft yarn to obtain a glass fiber fabric of 270 g/m².

The glass fiber-reinforced resin molded article of Example 2 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 2.

The glass fiber-reinforced resin molded article of Example 2 was measured also for the flexural modulus, and the weave pattern visibility, designability (weave pattern unevenness texture), surface smoothness, and radio wave transmissivity were evaluated, according to the methods described above. The results are shown in Table 2.

Example 3

A glass fiber-reinforced resin molded article of Example 3 was obtained exactly in the same manner as in Example 1 except that a glass fiber yarn comprising a mass of 295 tex, comprising the glass composition C shown in Table 1, was employed as the warp yarn and the weft yarn to obtain a glass fiber fabric of 280 g/m².

The glass fiber-reinforced resin molded article of Example 3 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 2.

The glass fiber-reinforced resin molded article of Example 3 was measured also for the flexural modulus, and the weave pattern visibility, designability (weave pattern unevenness texture), surface smoothness, and radio wave transmissivity were evaluated, according to the methods described above. The results are shown in Table 2.

Example 4

A glass fiber-reinforced resin molded article of Example 4 was obtained exactly in the same manner as in Example 1 except that a glass fiber yarn comprising a mass of 600 tex, comprising the glass composition C shown in Table 1, was employed as the warp yarn and the weft yarn, the warp yarn weaving density Wt was set to 9.0 yarns/25 mm, and the weft yarn weaving density Wy was set to 8.0 yarns/25 mm to obtain a glass fiber fabric of 420 g/m².

The glass fiber-reinforced resin molded article of Example 4 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 2.

The glass fiber-reinforced resin molded article of Example 4 was measured also for the flexural modulus, and the weave pattern visibility, designability (weave pattern unevenness texture), surface smoothness, and radio wave transmissivity were evaluated, according to the methods described above. The results are shown in Table 2.

Example 5

A glass fiber-reinforced resin molded article of Example 5 was obtained exactly in the same manner as in Example 1 except that a glass fiber yarn comprising a mass of 1150 tex, comprising the glass composition C shown in Table 1, was employed as the warp yarn and the weft yarn, the warp yarn weaving density Wt was set to 7.0 yarns/25 mm, and the weft yarn weaving density Wy was set to 6.5 yarns/25 mm to obtain a glass fiber fabric of 630 g/m².

The glass fiber-reinforced resin molded article of Example 5 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 2.

The glass fiber-reinforced resin molded article of Example 5 was measured also for the flexural modulus, and the weave pattern visibility, designability (weave pattern unevenness texture), surface smoothness, and radio wave transmissivity were evaluated, according to the methods described above. The results are shown in Table 2.

Example 6

A glass fiber-reinforced resin molded article of Example 6 was obtained exactly in the same manner as in Example 1 except that a glass fiber yarn comprising a mass of 135 tex, comprising the glass composition C shown in Table 1, was employed as the warp yarn and the weft yarn, the warp yarn weaving density Wt was set to 20.0 yarns/25 mm, and the weft yarn weaving density Wy was set to 20.0 yarns/25 mm to obtain a glass fiber fabric of 215 g/m².

The glass fiber-reinforced resin molded article of Example 6 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 3.

The glass fiber-reinforced resin molded article of Example 6 was measured also for the flexural modulus, and the weave pattern visibility, designability (weave pattern unevenness texture), surface smoothness, and radio wave transmissivity were evaluated, according to the methods described above. The results are shown in Table 3.

Example 7

A glass fiber-reinforced resin molded article of Example 7 was obtained exactly in the same manner as in Example 5 except that the glass fiber fabric was immersed in the silane coupling agent aqueous solution such that the amount of the silane coupling agent attached reached 0.01% by mass.

The glass fiber-reinforced resin molded article of Example 7 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 3.

The glass fiber-reinforced resin molded article of Example 7 was measured also for the flexural modulus, and the weave pattern visibility, designability (weave pattern unevenness texture), surface smoothness, and radio wave transmissivity were evaluated, according to the methods described above. The results are shown in Table 3.

Example 8

A glass fiber-reinforced resin molded article of Example 8 was obtained exactly in the same manner as in Example 5 except that the glass fiber fabric was immersed in the silane coupling agent aqueous solution such that the amount of the silane coupling agent attached reached 0.005% by mass.

The glass fiber-reinforced resin molded article of Example 8 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 3.

The glass fiber-reinforced resin molded article of Example 8 was measured also for the flexural modulus, and the weave pattern visibility, designability (weave pattern unevenness texture), surface smoothness, and radio wave transmissivity were evaluated, according to the methods described above. The results are shown in Table 3.

Example 9

A glass fiber-reinforced resin molded article of Example 9 was obtained exactly in the same manner as in Example 3 except that an acryl resin composition (designated as "acryl" in Table 3) was employed as the transparent resin. The acryl resin composition includes an acryl resin (manufactured by Osaka Organic Chemical Industry Ltd., trade name: Viscoat #155), a photopolymerization initiator (manufactured by BASF SE, trade name: Irgacure 184, (1-hydroxy-cyclohexyl-phenyl-ketone), and a solvent (manufactured by Shinko Organic Chemical Industry Ltd., diethylene glycol monoethyl ether acetate), and the total light transmittance of the resin composition is 98%.

The glass fiber-reinforced resin molded article of Example 9 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 3.

The glass fiber-reinforced resin molded article of Example 9 was measured also for the flexural modulus, and the weave pattern visibility, designability (weave pattern unevenness texture), surface smoothness, and radio wave transmissivity were evaluated, according to the methods described above. The results are shown in Table 3.

Comparative Example 1

A glass fiber-reinforced resin molded article of Comparative Example 1 was obtained exactly in the same manner as in Example 3 except that the glass fiber fabric was immersed in the silane coupling agent aqueous solution such that the amount of the silane coupling agent attached reached 0.04% by mass.

The glass fiber-reinforced resin molded article of Comparative Example 1 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 4.

The glass fiber-reinforced resin molded article of Comparative Example 1 was measured also for the flexural modulus, and the weave pattern visibility, designability (weave pattern unevenness texture), surface smoothness, and radio wave transmissivity were evaluated, according to the methods described above. The results are shown in Table 4.

Comparative Example 2

A glass fiber-reinforced resin molded article of Comparative Example 2 was obtained exactly in the same manner as in Example 5 except that the glass fiber fabric was immersed in the silane coupling agent aqueous solution such that the amount of the silane coupling agent attached reached 0.04% by mass.

The glass fiber-reinforced resin molded article of Comparative Example 2 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 4.

The glass fiber-reinforced resin molded article of Comparative Example 2 was measured also for the flexural modulus, and the weave pattern visibility, designability (weave pattern unevenness texture), surface smoothness, and radio wave transmissivity were evaluated, according to the methods described above. The results are shown in Table 4.

Comparative Example 3

A glass fiber-reinforced resin molded article of Comparative Example 3 was obtained exactly in the same manner as in Example 5 except that the glass fiber fabric was immersed in the silane coupling agent aqueous solution and then immersed in a black dye (manufactured by DIC Corporation, trade name: RYUDYE W BLACK B) solution such that the amount of the dye attached reached 2.0% by mass.

The glass fiber-reinforced resin molded article of Comparative Example 3 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 4.

The glass fiber-reinforced resin molded article of Comparative Example 3 was measured also for the flexural modulus, and the weave pattern visibility, designability (weave pattern unevenness texture), surface smoothness, and radio wave transmissivity were evaluated, according to the methods described above. The results are shown in Table 4.

Comparative Example 4

A glass fiber-reinforced resin molded article of Comparative Example 4 was obtained exactly in the same manner as in Example 5 except that the opening treatment with water flow pressure was conducted at a water flow pressure set to 0.1 MPa.

The glass fiber-reinforced resin molded article of Comparative Example 4 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 4.

The glass fiber-reinforced resin molded article of Comparative Example 4 was measured also for the flexural modulus, and the weave pattern visibility, designability (weave pattern unevenness texture), surface smoothness, and radio wave transmissivity were evaluated, according to the methods described above. The results are shown in Table 4.

Comparative Example 5

A glass fiber-reinforced resin molded article of Comparative Example 5 was obtained exactly in the same manner as in Example 5 except that the opening treatment with water flow pressure was conducted at a water flow pressure set to 3.5 MPa.

The glass fiber-reinforced resin molded article of Comparative Example 5 was measured for the average resin unimpregnation ratio in proximity to filament, warp yarn width Bt, weft yarn width By, and glass content, and the degree of widening of warp yarn Et and degree of widening of weft yarn Ey were calculated, according to the methods described above. The results are shown in Table 4.

The glass fiber-reinforced resin molded article of Comparative Example 5 was measured also for the flexural modulus, and the weave pattern visibility, designability (weave pattern unevenness texture), surface smoothness, and radio wave transmissivity were evaluated, according to the methods described above. The results are shown in Table 4.

TABLE 1

|  | Glass composition A | Glass composition B | Glass composition C |
|---|---|---|---|
| $SiO_2$ (% by mass) | 65 | 54 | 54 |
| $Al_2O_3$ (% by mass) | 25 | 15 | 14 |
| MgO (% by mass) | 10 | 4 | 1 |
| CaO (% by mass) | 0 | 4 | 23 |
| $B_2O_3$ (% by mass) | 0 | 19 | 6 |
| $Li_2O + Na_2O + K_2O + Fe_2O_3$ (% by mass) | 0 | 1 | 1 |
| $TiO_2 + F_2$ (% by mass) | 0 | 3 | 1 |
| Dielectric constant at measurement frequency of 1 GHz | 5.4 | 4.9 | 6.8 |

TABLE 2

|  |  | Example 1 | Example 2 | Example 3 | Example 4 | Example 5 |
|---|---|---|---|---|---|---|
| Glass fiber fabric | Glass composition | Glass composition A | Glass composition B | Glass composition C | Glass composition C | Glass composition C |
|  | Color tone | White | White | White | White | White |
|  | Warp yarn mass (tex; g/1000 m) | 285 | 275 | 295 | 600 | 1150 |
|  | Weft yarn mass (tex; g/1000 m) | 285 | 275 | 295 | 600 | 1150 |
|  | Warp yarn weaving density Wt (yarns/25 mm) | 12.5 | 12.5 | 12.5 | 9.0 | 7.0 |
|  | Weft yarn weaving density Wt (yarns/25 mm) | 12.5 | 12.5 | 12.5 | 8.0 | 6.5 |
|  | Mass per unit area (g/m$^2$) | 275 | 270 | 280 | 420 | 630 |
|  | Amount of silane coupling agent attached (% by mass) | 0.02 | 0.02 | 0.02 | 0.02 | 0.02 |
|  | Amount of dye attached (% by mass) | 0 | 0 | 0 | 0 | 0 |
| Transparent resin |  | Polyester | Polyester | Polyester | Polyester | Polyester |
| Glass fiber-reinforced resin molded article | Average resin unimpregnation ratio in proximity to filament (%) | 3.4 | 3.4 | 3.4 | 3.4 | 3.5 |
|  | Warp yarn width Bt of glass fiber fabric (mm) | 1.98 | 1.98 | 1.98 | 2.75 | 3.54 |
|  | Weft yarn width By of glass fiber fabric (mm) | 2.01 | 2.01 | 2.01 | 3.17 | 3.91 |
|  | Degree of widening of warp yarn Et = Bt/(25/Wt) | 0.99 | 0.99 | 0.99 | 0.99 | 0.99 |
|  | Degree of widening of weft yarn Et = By/(25/Wy) | 1.01 | 1.01 | 1.01 | 1.01 | 1.02 |
|  | Glass content (% by mass) | 68 | 67 | 70 | 70 | 70 |

TABLE 2-continued

|  | Example 1 | Example 2 | Example 3 | Example 4 | Example 5 |
|---|---|---|---|---|---|
| Flexural modulus (GPa) | 25 | 21 | 23 | 23 | 21 |
| Weave pattern visibility | Visible | Visible | Visible | Visible | Visible |
| Designability (aesthetic caused by reflected light) | A | A | A | A | A |
| Surface smoothness | A | A | A | A | B |
| Radio wave transmissivity | A | A | B | B | B |

TABLE 3

|  |  | Example 6 | Example 7 | Example 8 | Example 9 |
|---|---|---|---|---|---|
| Glass fiber fabric | Glass composition | Glass composition C | Glass composition C | Glass composition C | Glass composition C |
|  | Color tone | White | White | White | White |
|  | Warp yarn mass (tex; g/1000 m) | 135 | 1150 | 1150 | 295 |
|  | Weft yarn mass (tex; g/1000 m) | 135 | 1150 | 1150 | 295 |
|  | Warp yarn weaving density Wt (yarns/25 mm) | 20.0 | 7.0 | 7.0 | 12.5 |
|  | Weft yarn weaving density Wt (yarns/25 mm) | 20.0 | 6.5 | 6.5 | 12.5 |
|  | Mass per unit area (g/m$^2$) | 215 | 630 | 630 | 280 |
|  | Amount of silane coupling agent attached (% by mass) | 0.02 | 0.01 | 0.005 | 0.02 |
|  | Amount of dye attached (% by mass) | 0 | 0 | 0 | 0 |
| Transparent resin |  | Polyester | Polyester | Polyester | Acryl |
| Glass fiber-reinforced resin molded article | Average resin unimpregnation ratio in proximity to filament (%) | 2.3 | 25 | 34 | 2.8 |
|  | Warp yarn width Bt of glass fiber fabric (mm) | 0.95 | 3.54 | 3.54 | 1.98 |
|  | Weft yarn width By of glass fiber fabric (mm) | 1.21 | 3.91 | 3.91 | 2.01 |
|  | Degree of widening of warp yarn Et = Bt/(25/Wt) | 0.76 | 0.99 | 0.99 | 0.99 |
|  | Degree of widening of weft yarn Et = By/(25/Wy) | 0.97 | 1.02 | 1.02 | 1.01 |
|  | Glass content (% by mass) | 70 | 70 | 70 | 70 |
| Flexural modulus (GPa) |  | 19 | 17 | 11 | 19 |
| Weave pattern visibility |  | Visible | Visible | Visible | Visible |
| Designability (aesthetic caused by reflected light) |  | B | A | A | A |
| Surface smoothness |  | A | B | B | A |
| Radio wave transmissivity |  | B | B | B | B |

TABLE 4

|  |  | Comparative Example 1 | Comparative Example 2 | Comparative Example 3 | Comparative Example 4 | Comparative Example 5 |
|---|---|---|---|---|---|---|
| Glass fiber fabric | Glass composition | Glass composition C | Glass composition C | Glass composition C | Glass composition C | Glass composition C |
|  | Color tone | White | White | Black | White | White |
|  | Warp yarn mass (tex; g/1000 m) | 295 | 1150 | 1150 | 1150 | 1150 |
|  | Weft yarn mass (tex; g/1000 m) | 295 | 1150 | 1150 | 1150 | 1150 |
|  | Warp yarn weaving density Wt (yarns/25 mm) | 12.5 | 7.0 | 7.0 | 7.0 | 7.0 |
|  | Weft yarn weaving density Wt (yarns/25 mm) | 12.5 | 6.5 | 6.5 | 6.5 | 6.5 |
|  | Mass per unit area (g/m$^2$) | 280 | 630 | 630 | 630 | 630 |
|  | Amount of silane coupling agent attached (% by mass) | 0.04 | 0.04 | 0.02 | 0.02 | 0.02 |
|  | Amount of dye attached (% by mass) | 0 | 0 | 2.0 | 0 | 0 |
| Transparent resin |  | Polyester | Polyester | Polyester | Polyester | Polyester |
| Glass fiber-reinforced resin molded article | Average resin unimpregnation ratio in proximity to filament (%) | 1 | 1 | 80 | 3.4 | 3.4 |
|  | Warp yarn width Bt of glass fiber fabric (mm) | 1.98 | 3.54 | 3.58 | 2.21 | 4.28 |
|  | Weft yarn width By of glass fiber fabric (mm) | 2.01 | 3.91 | 3.85 | 2.48 | 4.64 |
|  | Degree of widening of warp yarn Et = Bt/(25/Wt) | 0.99 | 0.99 | 1.00 | 0.62 | 1.20 |
|  | Degree of widening of weft yarn Et = By/(25/Wy) | 1.01 | 1.02 | 1.00 | 0.64 | 1.21 |
|  | Glass content (% by mass) | 70 | 70 | 77 | 70 | 70 |
| Flexural modulus (GPa) |  | 22 | 22 | 8 | 12 | 20 |
| Weave pattern visibility |  | Not visible | Not visible | Visible | Visible | Visible |
| Designability (aesthetic caused by reflected light) |  | — | — | A | C | C |
| Surface smoothness |  | A | B | C | C | A |
| Radio wave transmissivity |  | B | B | B | B | B |

As shown in Table 2 and Table 3, in the glass fiber-reinforced resin molded articles of Examples 1 to 9, in which the average resin unimpregnation ratio in proximity to filament of the glass fiber fabric is more than 2.0% and 50.0% or less, the warp yarn width Bt and the weft yarn width By of the glass fiber fabric each are in the range of 0.50 mm to 8.50 mm, the warp yarn weaving density Wt and the weft yarn weaving density Wy of the glass fiber fabric each are in the range of 3.0 yarns/25 mm to 50.0 yarns/25 mm, and the degree of widening of warp yarn Et calculated by Bt/(25/Wt) and the degree of widening of weft yarn Ey calculated by By/(25/Wy) of the glass fiber fabric each are in the range of 0.70 to 1.10, the weave pattern of the glass fiber fabric is visible, the designability comprised by the glass fiber fabric is exerted, and the glass fiber fabric exerts a sufficient reinforcing effect.

In contrast, as shown in Table 4, in the glass fiber-reinforced resin molded articles of Comparative Examples 1 to 3, in which the average resin unimpregnation ratio in proximity to filament is out of the range of more than 2.0% and 50.0% or less, the weave pattern of the glass fiber fabric is not visible, or the glass fiber fabric does not exert a sufficient reinforcing effect.

In the glass fiber-reinforced resin molded articles of Comparative Examples 4 and 5, in which the degree of widening of warp yarn Et and the degree of widening of weft yarn Ey are out of the range of 0.70 to 1.10, the designability comprised by the glass fiber fabric is not sufficiently exerted.

REFERENCE SIGNS LIST 1 glass filament
2 measurement region
3 void portion

The invention claimed is:

1. A glass fiber-reinforced resin molded article comprising:
   a glass fiber fabric; and
   a transparent resin, wherein
   an average resin unimpregnation ratio in proximity to filament of the glass fiber fabric is more than 2.0% and 50.0% or less,
   a warp yarn width Bt and a weft yarn width By of the glass fiber fabric each are in a range of 0.50 mm to 8.50 mm,
   a warp yarn weaving density Wt and a weft yarn weaving density Wy of the glass fiber fabric each are in a range of 3.0 yarns/25 mm to 50 yarns/25 mm, and
   a degree of widening of warp yarn Et calculated by Bt/(25/Wt) and a degree of widening of weft yarn Ey calculated by By/(25/Wy) of the glass fiber fabric each are in a range of 0.70 to 1.10.

2. The glass fiber-reinforced resin molded article according to claim 1, wherein the average resin unimpregnation ratio in proximity to filament of the glass fiber fabric is 2.1% or more and 28.0% or less.

3. The glass fiber-reinforced resin molded article according to claim 1, wherein the average resin unimpregnation ratio in proximity to filament of the glass fiber fabric is 2.5% or more and 10.0% or less.

4. The glass fiber-reinforced resin molded article according to claim 1, wherein the resin unimpregnation ratio in proximity to filament of the glass fiber fabric is 3.1% or more and 5.0% or less on average.

5. The glass fiber-reinforced resin molded article according to claim 1, wherein a weight of the warp yarn and a weight of the weft yarn of the glass fiber fabric each are in a range of 210 tex to 850 tex.

6. The glass fiber-reinforced resin molded article according to claim 1, wherein a dielectric constant at a measurement frequency of 1 GHz of the glass fiber constituting the warp yarn and the weft yarn of the glass fiber fabric is 5.5 or less.

7. The glass fiber-reinforced resin molded article according to claim 1, wherein a glass composition of the glass fiber constituting the warp yarn and the weft yarn of the glass fiber fabric is a glass composition comprising $SiO_2$ in a range of 60.0% by mass to 70.0% by mass, $Al_2O_3$ in a range of 20.0% by mass to 30.0% by mass, and MgO in a range of 5.0% by mass to 15.0% by mass with respect to a total amount of the glass fiber.

8. An electronic device housing comprising the glass fiber-reinforced resin molded article according to claim 1.

9. An interior component for a mobility product comprising the glass fiber-reinforced resin molded article according to claim 1.

10. An exterior component for a mobility product comprising the glass fiber-reinforced resin molded article according to claim 1.

* * * * *